Feb. 15, 1938.  E. J. MULLEN  2,108,593
PROCESS AND APPARATUS FOR ROASTING ORES
Filed Dec. 23, 1935  3 Sheets-Sheet 2

INVENTOR
Edwin J. Mullen
BY
ATTORNEY

Feb. 15, 1938.  E. J. MULLEN  2,108,593
PROCESS AND APPARATUS FOR ROASTING ORES
Filed Dec. 23, 1935  3 Sheets-Sheet 3

Fig. 4

INVENTOR
Edwin J. Mullen
BY
ATTORNEY

Patented Feb. 15, 1938

2,108,593

UNITED STATES PATENT OFFICE 2,108,593

PROCESS AND APPARATUS FOR ROASTING ORES

Edwin J. Mullen, New Rochelle, N. Y., assignor to General Chemical Company, New York, N. Y., a corporation of New York Application December 23, 1935, Serial No. 55,809

13 Claims. (Cl. 75—9)

This invention is directed to methods and apparatus for roasting sulfide ores to desulfurize the same and to produce sulfur dioxide for use in the manufacture of sulfuric acid, or for any other purposes desired.

To a substantial extent, present practice in roasting of sulfides such as pyrites includes use of mechanically operated multiple hearth furnaces, such for example as the well-known Mac-Dougall, Herreshoff and Wedge burners. As distinguished from the bed or hearth roasting operation of these burners, it has been suggested to roast finely divided sulfides while in gaseous suspension. Suspension roasting processes such as shown for example in Burgoyne and Cordy U. S. Patent No. 1,758,188 of May 13, 1930, have been developed largely because of availability in recent years of supplies of sulfides, such as flotation concentrates, sufficiently finely divided to permit roasting by suspension methods.

In the present state of the art of producing sulfur dioxide from sulfides, it may be said that probably the major portion of the sulfur dioxide utilized in the manufacture of sulfur trioxide by the contact process is obtained by roasting what is known as pyrites "smalls". The usual run-of-pile of pyrites smalls has been crushed so that 100% passes a half inch screen. A material portion of an ore of this type is sufficiently finely divided for suspension roasting if separated from the coarser material, although a large portion of the smalls, in many cases the major portion, comprises ore too coarse for suspension roasting by present methods. In the present specification, "smalls" is used in a generic sense to define a run-of-pile ore containing some ore fine enough for suspension roasting and some ore too coarse for suspension roasting. The term "coarse" is used to denote ore of too large particle size for roasting by suspension methods, and "fines" is utilized to designate sulfide ores sufficiently finely divided to permit roasting by suspension methods.

Since smalls usually contain a substantial portion of coarse ore, the smalls have heretofore been roasted as in a multi-hearth roaster or ground to a sufficient degree of fineness to permit suspension roasting. While multi-hearth furnaces such as the Wedge and Herreshoff burners provide effective roasting, use of burners of this type is objectionable principally on account of the low capacity per unit of apparatus per unit of time, and also because the complicated construction and operation involves substantial initial and maintenance expense. On the other hand, grinding of raw run-of-pile smalls to such an extent that all of the ore may be roasted in gaseous suspension is not desirable since in many instances grinding costs are prohibitive.

The present invention aims to provide a method for roasting sulfide ore, such as pyrites smalls, by means of which method the smalls are introduced into a combustion zone and the fines content of a body of smalls may be roasted in suspension and that portion of the smalls too coarse for complete roasting in such combustion zone, during the time the fines content of the smalls is being roasted in suspension, is simultaneously converted to a frangible condition facilitating further roasting thereof, for example it has been found to be readily grindable to a degree of fineness suitable for subsequent suspension roasting. Grinding costs are thereby greatly reduced, and the smalls may be roasted in a way much more efficiently than in a standard multi-hearth burner. As an alternative procedure, the coarse ore after conversion to a frangible condition may be further roasted in a bed roasting operation. The frangible condition of the coarse ore renders the bed roasting thereof much more efficient than in the case of coarse ore which has not been so treated. Another object of the invention is to provide apparatus for carrying out the improved process.

The nature of the invention and the objects and advantages thereof may be fully understood from consideration of the following description taken in connection with the accompanying drawings in which—

Figure 1:
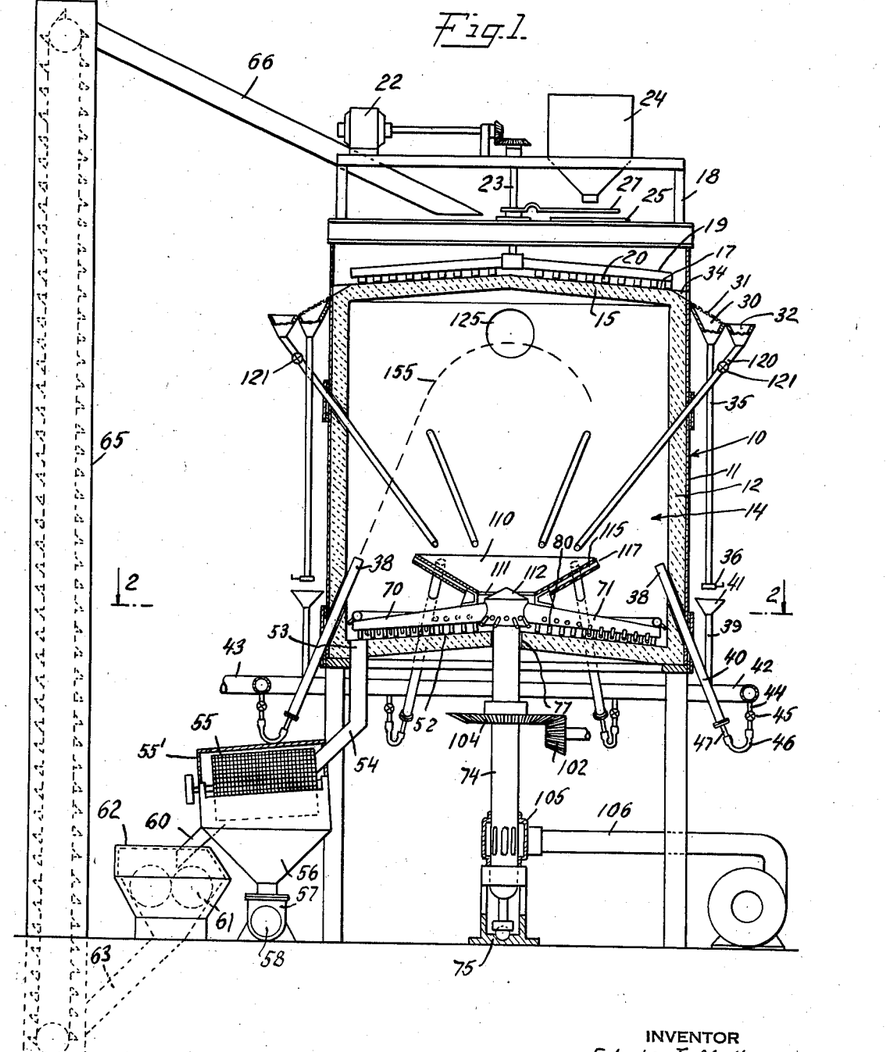
Fig. 1 is a vertical longitudinal section of a burner in which the improved process may be carried out.

Referring to Fig. 1, 10 designates a burner comprising a steel shell or casing 11 within which is placed the furnace lining 12 constructed of suitable refractory material, such as firebrick and defining a roasting chamber 14 of circular, horizontal cross-section. The upper part of the combustion chamber is closed off by a crown 15 the top side of which forms a drying or preheating hearth 17. The shell 11 projects upwardly beyond crown 15 and carries a steel framework 18 which in turn supports ore feeding and rabbling mechanism for the drying hearth. The surface of hearth 17 is slightly cone-shaped and slopes downwardly toward the shell of the burner. Lying above the hearth are rabble arms 19 having downwardly projecting plows 20 pitched to work sulfides gradually toward the circumference of the drying hearth. Arms 19 are rotated by motor 22 through shaft 23 supported in bearings so as to maintain the lower ends of plows 20 spaced with respect to the surface of hearth 17. A smalls ore bin 24, mounted on framework 18, discharges ore onto a platform 25 from which the smalls are intermittently dropped to the center of drying hearth 17 by a sweep 27 rotating with shaft 23.

Attached to shell 11 by brackets not shown are hoppers 30 covered by sloping screens 31. Cut through shell 11 and also through the upper edge of lining 12 are downwardly sloping passages or conduits 34 through which smalls are passed from hearth 17 to screens 31. It will be understood the number of conduits 34 and hoppers 30 and 32 used in connection with the burner corresponds with however many ore injectors 40 may be employed. On rotation of rabble arms 19, the sulfide ore is gradually fed through openings 34 onto the screens 31 which separate the coarse ore and the fines, the fines collecting in hoppers 30, and the coarse ore in hoppers 32. Hoppers 30 discharge fines into injector feed pipes 35 having at their lower ends any suitable means such as slide valves 36 for controlling flow of fines out of the lower ends of pipes 35.

Figure 3:
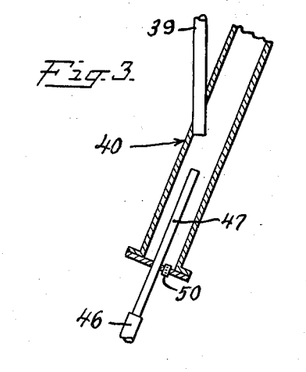
Fig. 3 is an enlarged vertical section of a preferred type of fines injector.

The fines injectors 40 comprise principally an elongated pipe section or nozzle 38 constituting a fines inlet conduit. A pipe 39, carrying on the upper end a funnel 41, is arranged to feed fines into the lower end of nozzle 38. Air or other gas used to inject the fines into the burner is supplied from a bustle 42, surrounding the lower end of the burner, and connected to a blower or other source of air through pipe 43. Adjacent each injector 40, pipe 42 is provided with an air outlet nipple 44 having a control valve 45. Numeral 46 represents a flexible hose connection attached at one end to nipple 44 and at the other end to jet 47. The lower end of nozzle 38 is provided with a clean-out plug 50. Each injector unit, comprising a nozzle 38, feed pipe 39, and funnel 41, may be supported by a bracket, not shown, in such a way as to permit adjustment of the angle between the axes of nozzles 38 and the horizontal and also the angle between the axes of the nozzles 38 and the radii of the combustion chamber. The burner may be provided with any suitable number of injectors, and in the embodiment illustrated, six injectors 40 are employed.

The bottom of the combustion chamber is formed by a slightly cone-shaped hearth 52 sloping downwardly toward the shell of the burner. Spaced about the periphery of the hearth are outlets 53 through which cinder is discharged by means of pipes 54 into an associated rotatable cylindrical screen 55, enclosed in a suitable gastight housing 55'. Cinder passing the screen is collected in hopper 56 and runs into a chamber 57 from which the cinder may be removed as by a conveyor 58. Cinder too coarse to pass screen 55 runs into chute 60 and to a crusher 61 covered by a housing 62 and arranged to feed crushed cinder through conduit 63 into the pit of an elevator 65 by means of which cinder is conveyed to the top of a chute 66 discharging the cinder onto hearth 17.

Figure 2:
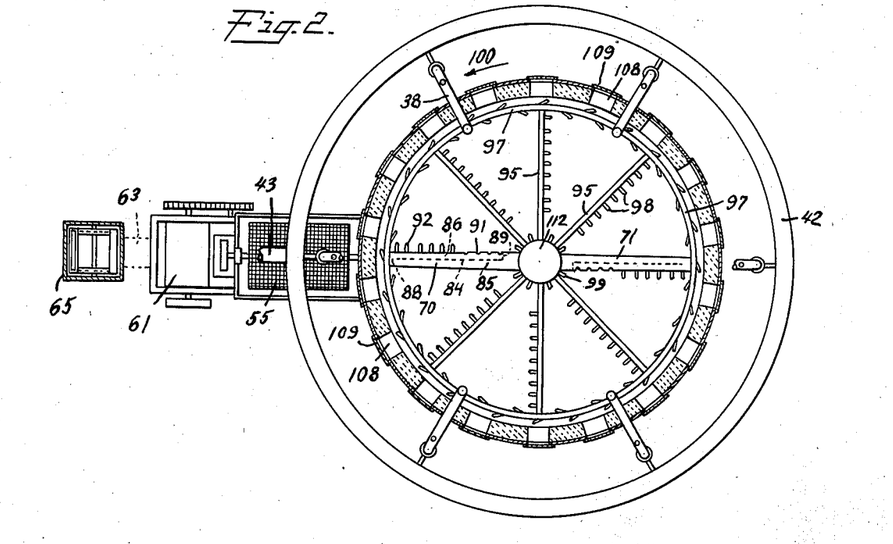
Fig. 2 is a horizontal section taken approximately on the line 2—2 of Fig. 1.

Located in the bottom of the combustion chamber are rabble arms 70 and 71, shown in elevation in Fig. 1 and in plan in Fig. 2, carried on the upper end of a hollow shaft 74 supported at the base by a bearing 75. Shaft 74 passes through the center of hearth 52 and is made as at 77 with a suitable joint to prevent gas escape from the combustion chamber. Arms 70 and 71 are equipped on the lower side with plows 80 pitched so as to gradually work solids from the center of the hearth outwardly to discharge outlets 53. It will be understood arms 70 and 71 are attached to the upper end of shaft 74 high enough to hold the lower ends of plows 80 spaced sufficiently above the surface of hearth 52 to permit maintenance thereon of a bed of roasting ore and/or cinder of any desired degree of thickness.

Referring to Fig. 2, it will be seen hollow arm 70 is made with a vertical longitudinal partition 84 forming air passages 85 and 86. Passage 85 communicates at the inner end with hollow shaft 74 and at the outer end, as at 88, with the outer end of passage 86 terminated by a dead end 89. The lower side of arm 70 is provided with a series of ports 91, opening into passage 86, into which ports are set air jets 92 positioned to cause air discharged through the jets to impinge at an angle upon the surface of a bed of ore and/or cinder lying on hearth 52. Arm 71 is made in the same way as arm 70.

Additional quantities of air are supplied to the lower end of the combustion chamber through hollow radial pipes or arms 95 opening at one end into shaft 74 and at the other end into a circular air distributing pipe 97. From Fig. 2, it will be seen radial pipes 95 and circular pipe 97 are provided with air jets 98 positioned similarly to air jets 92 carried by rabble arms 70 and 71. The upper end of shaft 74 is also provided with a plurality of circumferentially spaced air jets 99 by means of which air may be supplied to the surface of the bed immediately surrounding the shaft. In operation, shaft 74 and the associated rabble arms 70 and 71, radial pipes 95 and circular distributing pipe 97 are rotated in the direction of arrow 100 in Fig. 2 through pinion 102 and gear 104 from a source of power not shown. In the apparatus illustrated in Fig. 1, the greater part of the air used in the roasting operation is introduced into the lower end of the combustion chamber through shaft 74 to which air is furnished from a housing 105 surrounding the shaft and connected to an air pipe 106 to which air is supplied by a blower. A relatively small amount of air may be drawn into the burner through chute 63 and screen housing 55' to prevent loss of sulfurous gases and to avoid pollution of the atmosphere. The balance of the air used in the combustion chamber may be drawn in through one or more ports 108 (Fig. 2) in the lower wall. Ports 108 may be provided with removable covers 109.

As shown by Fig. 1, carried by arms 70 and 71 is a coarse ore collector or funnel 110 having in the bottom an outlet opening 111 appreciably larger in diameter than the upper end 112 of shaft 74. Collector 110 may be made of heat-resistant material, or may be provided with an air jacket 115 communicating at the lower end by connections not shown with hollow arms 70 and 71 and having a plurality of circumferential outlets 117 at the upper edge through which air is discharged into the combustion chamber and utilized in the roasting reaction.

Hoppers 32 supply coarse ore into coarse ore feed pipes 120 which pass through the burner wall into the combustion chamber 14 and discharge ore onto the upper surface of collector 110. Those portions of pipes 120 within the combustion chamber 14 may be cooled by suitable air or water jacketing. Coarse ore runs from the surface of collector 110 through opening 111 onto the approximate center of hearth 52.

A gas main 125, for withdrawing gaseous products of combustion from the burner, opens into the combustion chamber 14 at a point just below crown 15.

Figure 4:
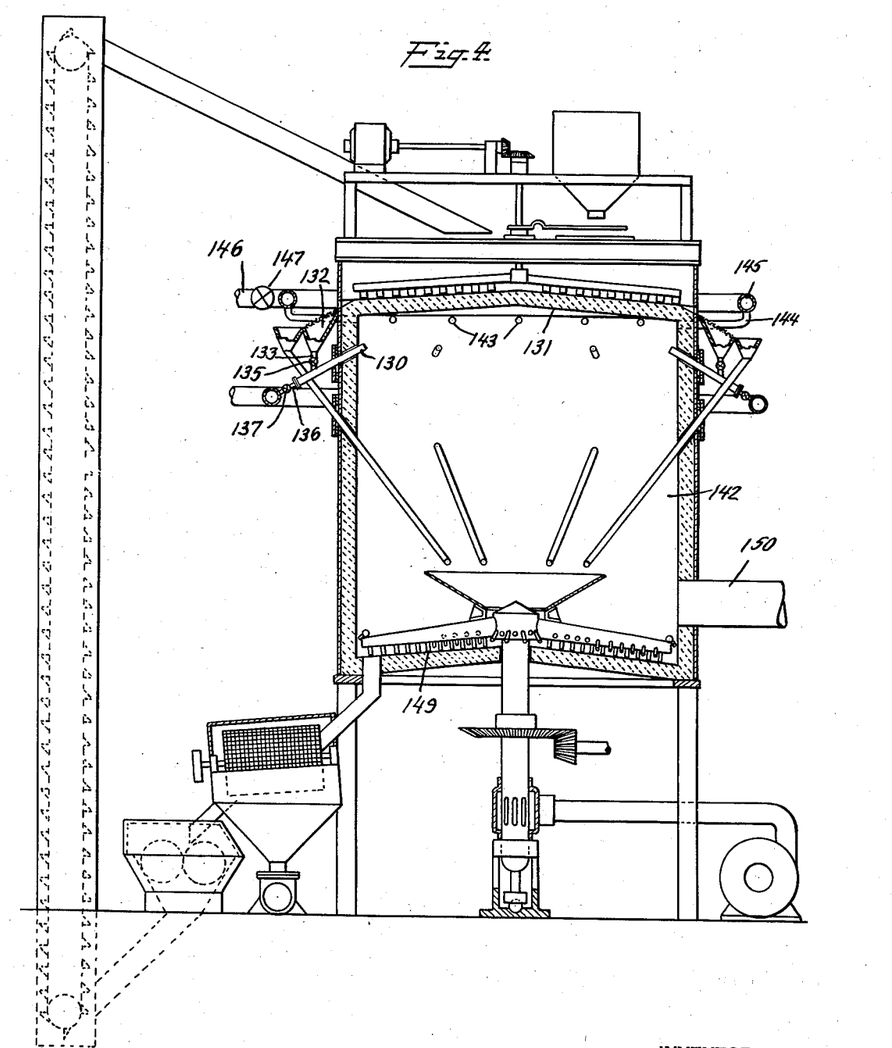
Fig. 4 is a vertical longitudinal section of a modified burner.

In the modified form of burner shown in Fig. 4, the construction is substantially the same as illustrated in Fig. 1 except that the injector nozzles 130 pass through the burner walls at a point just below crown 131. Nozzles 130 are pitched at a considerably lower angle than nozzles 38 of Fig. 1, and as in the case of nozzles 38 may be made so as to permit some limited adjustment of the nozzles between the axes of nozzles 130 and the horizontal, and/or the radial planes of the combustion chamber. The fines from hoppers 132 are fed through short pipes 133, having control valves 135, into the lower ends of nozzles 130. Flow of air into the nozzles through jets 136 may be regulated by valves 137.

Provision is made for introducing air into the top of the combustion chamber 142 through a series of circumferentially spaced ports 143 each of which communicates with a pipe 144 connected at the outer end with an air bustle 145. Air is introduced into bustle 145 through an inlet pipe 146, having a control valve 147, connected to a blower not shown. Gaseous products of combustion are withdrawn through a gas main 150 opening into the lower end of the combustion chamber.

The invention is applicable to the roasting of sulfide ores such as iron pyrites, pyrrhotite, zinc sulfide or arsenopyrite, but for convenience the operation of the process will be described in connection with the roasting of iron pyrites smalls. Since the process of the invention is especially adapted to handle smalls containing a major portion (by weight) of coarse ore and a minor portion of fines, in the following specific example, given to illustrate one preferred embodiment of the invention, it may be assumed the ore referred to is a run-of-pile "smalls" ore, 100% passing a half inch screen and containing about 80% coarse ore insufficiently finely divided for suspension roasting, and about 20% fines (e. g. 30 mesh or finer) of such size as to permit roasting in suspension.

A supply of pyrites smalls is maintained in bin 24 by suitable conveyor or elevator, not shown. Before roasting is begun, combustion chamber 14 is preheated to temperatures above the ignition point of the ore to be roasted, as by oil burners inserted through conveniently located work-holes not shown. When the desired degree of preheat is obtained, motor 22 is started, and rabble arms 19 and sweep 27 may be rotated at a rate of say one revolution in two minutes. Smalls run continuously out of bin 24 onto platform 25, and on each revolution of shaft 23 a regulated quantity of ore is swept off the platform to approximately the center of drying hearth 17. During rotation of arms 19, the sulfide smalls are gradually worked across the surface of hearth 17 and into the several passages 34, each of which discharges smalls onto a screen 31 which may for example be about 30 mesh. The fines, about 30 mesh and finer, collect in hoppers 30, and the coarse ore runs into and is collected in hoppers 32. During movement of the smalls over hearth 17, the fines and the coarse ore may be preheated as a rule to about 250° F. and generally not in excess of about 400–500° F.

Referring first more particularly to the suspension roasting phase of the process, the dry or dry and preheated fines run from hoppers 30 into feed pipes 35. Valves 36 in pipes 35 are adjusted so that substantially steady streams of fines run into the lower ends of nozzles 38 through funnels 41 and pipes 39. Air, steam, or other gas, not adversely affecting oxidation of the sulfide, may be employed to charge the fines into the combustion chamber. For this purpose, it is preferred to employ air which may be admitted to the lower ends of nozzles 38 through jets 47 at pressures of, for example, about 5 pounds per square inch.

The angle of the axes of nozzles with the horizontal is dependent upon the size and type of combustion chamber. The angle of the axes of nozzles 38, the amount of fines fed into the injectors through pipes 39, and the air pressure in jets 47, adjusted by valves 45, are all regulated with respect to the size of the particular roasting chamber so that the fines particles from each injector rise through the combustion chamber, away from the walls thereof, to an elevation just below the underside of crown 15. The angular position of nozzles 38 (made adjustable to a limited extent to suit different operating conditions) and the rate of supply of fines and air thereto are likewise controlled so that horizontal travel of fines particles while reaching the top of the combustion chamber and after dropping to the bottom, preferably does not exceed, say, three-quarters of the diameter of the roasting chamber. In this way, contact between any substantial quantities of fines particles and the hot walls of the roasting chamber is prevented, thus avoiding accumulation of scar on the highly heated walls. Referring to Fig. 1, dotted line 155 indicates the approximate path of travel of a fines particle of average size introduced through the injector on the left side of the burner.

Since two or more injectors (in the present instance six) are preferably employed, contacting of the fines particles, constituting the individual streams fed into the combustion chamber by the separate injectors, breaks up the normal paths of travel of the ore particles so that the drop of the fines from the top to the bottom of the combustion chamber is a substantially straight line fall, or one at a high angle. With respect to the path of travel of fines through the combustion chamber, the fines particles move upwardly at an angle somewhat less than the pitch of nozzles 38, to an elevation just below crown 15 where, by commingling of the particles of several individual streams of fines, a relatively uniform dispersion is formed over a major portion of the upper end of the combustion chamber. The particles then settle in more or less straight lines, at a rate about or approaching that induced by gravity, toward the hearth in the bottom of the combustion chamber. In this way, the fines are caused to pass over substantially the longest possible path of travel in any particular combustion chamber. During the latter part of the upward travel of the fines, the rate of vertical movement thereof rapidly decreases to zero, and thereafter, during the initial part of the descent of the fines, the rate of downward movement of the fines is relatively small. Hence, while passing upwardly and downwardly through the upper zone of the combustion chamber, the average rate of movement of the fines is low, and this slow rate of travel increases the time the particles are in the roasting atmosphere, thereby giving a relatively long time for the suspension roasting to proceed, thus permitting use of a roasting chamber of relatively short vertical dimension, and making possible high capacity of the burner.

The major portion of the total quantity of air, or other oxidizing gas, necessary to support suspension roasting of the fines and hearth roasting of the coarse ore, aside from the relatively small amount of air which may be drawn in through cinder chute 63, is introduced into the bottom of the combustion chamber through shaft 74, arms 70, 71, 95, and pipe 97. Where air is employed for injecting the fines through nozzles 38, usually substantially less than about 10% of the total air required for oxidation would ordinarily be introduced through air jets 47. Hence, it may be considered that in this example substantially all the air needed is introduced into the bottom of the combustion chamber through shaft 74. In the specific embodiment of the invention described, the combustion chamber may be about 16 feet high, and the diameter of the combustion chamber may be about the same. While such particular proportions of the roasting chamber are satisfactory, it is to be understood the diameter of the chamber may in some instances advantageously exceed the height by a substantial amount, and may also be somewhat less than the height. Since the combustion chamber preferably has a large diameter per unit of volume, the velocity of the upwardly flowing gas stream may be held low, thus avoiding undue disturbance of movement of fines in the combustion chamber above the hearth. Further, where the proportions of the combustion chamber are about as stated, the loss of heat to the outside atmosphere is minimized, permitting the inner wall area to efficiently supply radiant heat to the roasting or partial roasting of coarse ore taking place on the hearth 52. Under some operating conditions it may be desirable to provide for introduction of an appreciable fraction of the air required for combustion thru one or more of the ports 108 in the burner wall. It will be understood the burner as a whole operates under minus pressure induced by a fan in gas-line 125.

The sulfide fines, dried and more or less preheated, are injected into the lower end of the combustion chamber and into an atmosphere relatively rich in oxygen. Heating of the upwardly moving fines particles to ignition temperature takes place rapidly, owing to the absorption of radiant heat from the suspension zone and from the coarse ore roasting on the hearth.

Following ignition, the fines rise to approximately the top of the combustion chamber, the temperature of the particles increasing because of rapidly progressing roasting. The temperature of the roasting operation as a whole may be around 1800° F. At the uppermost point of travel of the fines, a relatively uniform distribution of partially roasted fines particles is formed over the major portion of the upper end of the combustion zone and the downward movement of the particles begins. The fines thereafter drop through the combustion chamber at a rate of about or approaching that of similar particles falling under the influence of gravity, since operations are preferably so conducted that the velocity of the stream of gas rising through the combustion chamber is not sufficient to interfere with the free gravity fall of the fines. Because of the angular pitch of nozzles 38, and other above-noted control conditions, fines particles during the upward movement are not thrown against the walls of the roasting chamber, and thus contact of fines with the hot walls of the combustion chamber is avoided when the fines are in a state conducive to scarring. As the downward flow of the fines is in substantially straight lines or at a high angle, subsequent contact of fines with the walls of the combustion chamber is avoided, thus further preventing conditions under which scarring of the burner might take place. The relatively cool condition of feed pipes 120 seems to prevent accumulation of scar thereon.

At the time downward movement of the fines particles begins, roasting is well under way, but because of the decreasing sulfur content of the fines, to complete roasting, it is desirable to cause the fines particles to pass through an atmosphere increasingly rich in oxygen. In the operation of the present process, this condition is present. Although the upwardly flowing gas stream contains all the sulfur dioxide formed by the roasting or partial roasting of the coarse ore on hearth 52, it will be understood that with respect to the amount of oxygen needed to effect roasting of the fines, the fines roasting atmosphere is richest in oxygen at the bottom of the combustion chamber and decreases toward the top on account of consumption of oxygen in oxidation of sulfur and iron of the fines. During fall through the combustion chamber, roasting of fines is completed, and finely divided free-flowing iron oxide cinder falls onto the bed of coarse ore on the hearth 52. The result of completion of roasting of a given quantity of sulfide fines is production of a given amount of sulfur dioxide and iron oxide cinder, and generation of a substantial amount of heat which is made available as radiant heat reflected back into the combustion zone by the burner walls.

In accordance with the present invention, while the fines contained in any given quantity of smalls are being roasted in suspension as above described during a given time interval, (the term "time interval" being used to designate the interval of time required to react the total quantity of fines contained in a given quantity of smalls as distinguished from the time interval required to flash roast a given fines particle) the coarse ore contained in such quantity of smalls is being simultaneously roasted or partially roasted and reduced to a frangible condition during substantially the same time interval in a bed roasting operation with the aid of the high temperatures generated by the suspension roasting of the fines.

As indicated, the suspension roasting operation develops temperatures in the combustion chamber of around 1800-2000° F. In accordance with the invention, these high temperatures are utilized to effect roasting of part of the coarse ore fed into the combustion chamber through pipes 120, and conversion of the balance of the coarse ore to a partially roasted, markedly frangible condition of such nature that the partially roasted ore, after discharge from the combustion chamber, may be easily cracked and broken up to a size such that this portion of the ore may be reintroduced into the combustion chamber and roasted, or roasting completed, in the suspension roasting phase of the process.

In accordance with the invention, it has been found that when coarse ore is introduced into a combustion zone and suddenly subjected to relatively high temperatures, preferably not less than about 1300° F., the coarse ore is converted to a condition such as to facilitate substantially complete roasting of some of the finer particles of the coarse ore, and such as to transform those particles of the coarse ore, too coarse for substantially complete roasting during the time of exposure to the roasting temperatures, to a frangible, brittle condition making possible first and preferably, ready breaking down or pulverizing to a degree of fineness such that the particles may be roasted thereafter in suspension, or second and alternatively, more efficient roasting of such coarse ore particles in a bed roasting operation if desired. According to the invention, it has been found that temperature conditions present in a zone in which sulfide fines are being roasted in suspension are admirably suited to carry out such treatment of coarse ore.

When proceeding in accordance with the preferred process of the invention, the coarse ore which may be preheated to temperatures of around 250° F. and not generally in excess of about 400–500° F. is fed from hoppers 32 into the combustion chamber through pipes 120, and the rate of introduction is regulated by valves 121. The coarse ore runs off collector 110 onto the center of hearth 52. Owing to the high combustion chamber temperatures, which are preferably not less than and are usually much in excess of about 1300° F., the coarse ore particles are very suddenly subjected to high temperatures, and experience indicates the loosely combined sulfur of the coarse ore is practically instantaneously volatilized on sudden introduction of the coarse ore into the high temperature atmosphere of the combustion zone, and on account of such sudden exposure to high temperatures and consequent differential expansion, strains are set up in the coarse ore particles, thus disrupting and converting the ore particles to a porous condition. In accordance with the invention, it has been found that when the coarse ore is injected or otherwise introduced suddenly into a combustion zone where temperatures are preferably not less than about 1300° F., the resulting differential expansion and rapid volatilization of loosely combined sulfur appears to exert, within the lumps of coarse ore, explosive forces which open up the ore, rendering the particles porous and permitting rapid reaction of oxygen with some or all of the sulfur contained in the coarse ore. The sudden subjection of the ore to high temperatures referred to should be distinguished from gradual heating of the ore to the temperatures indicated. Treatment herein contemplates sudden subjection of coarse ore, heated to temperatures say not more than about 400–500° F., to temperatures of not less than about 1300° F.

The degree of desulfurization of an individual particle of coarse ore depends largely upon the size of the particle and the time during which the particle is exposed to roasting conditions. For a given rate of feed of coarse ore and rotation of rabble arms 70 and 71, some of the finer particles of the coarse ore will have been substantially completely desulfurized when discharged into pipes 54, and the coarser particles may be substantially undesulfurized, that is, such coarser particles have a sulfur content too high to permit economic discharge from the process. The expression "substantially undesulfurized" is intended to indicate cinder particles containing say more than about 2% sulfur. For example, when roasting a body of smalls of the general nature mentioned in the present specific example, under average conditions, that portion of the coarse ore passing say a 10 mesh screen will generally be found to have been sufficiently completely desulfurized to permit discharge from the process as iron oxide cinder, and that portion of the cinder coarser than about 10 mesh may be incompletely desulfurized. Accordingly, under some operating conditions solid material discharged from hearth 52 is fed into rotating screen 55 which for example may be 10 mesh. All the material, substantially all magnetic iron oxide, passing the screen and collecting in chamber 57 may be discharged from the process. Material coarser than 10 mesh is fed to the crusher 61. Since this material has been converted in the combustion chamber to remarkably frangible condition, crushing of such material is a simple and inexpensive proposition. Crusher 61 may be adjusted so as to grind the material to pass say 30 mesh. If desired, the material discharged through chutes 60 may be cooled as by a water spray not shown. The material thus crushed finely enough to permit suspension roasting is transferred by elevator 65 and chute 66 to approximately the center of drying hearth 17 where the material is dried, if damp, mixed with smalls being supplied to the process, and subsequently roasted in suspension in the combustion chamber as described. It will be understood that the mesh of screen 55 may be changed to suit different operating conditions so as to effect return to the combustion chamber of all cinder particles containing more than say 2% sulfur.

The discovery that the partially roasted coarse ore may be converted to a frangible condition offering substantially less resistance to crushing provides a practical way of securing the advantages of suspension burning in handling grades of sulfur bearing ores at least portions of which are too coarse to be satisfactorily handled directly by suspension methods. Discovery of the change in physical properties of sulfur bearing ores taking place on partial desulfurization makes possible easier and more economical grinding of the coarse fraction and greatly simplifies the equipment required as compared with apparatus for pulverizing all of the raw ore to pass say a 30 mesh screen.

It will be understood the amount of air (preheated if desired) introduced through the hollow shaft 74, rabble arms 70 and 71, radial arms 95 and the circular distribution pipe 97 (and through ports 108 if utilized) is regulated so as to provide in the combustion chamber enough oxygen for oxidation of whatever portion of the coarse material may be roasted on hearth 52 and also to supply most of the oxygen required to effect oxidation of the fines which are roasted while in suspension. As is shown in Fig. 2, air is supplied to the bed of coarse ore relatively uniformly over the entire surface. As the amount of air passing through the air jets includes much of that needed in the suspension roasting of the fines, it will be seen that an excess of air is distributed over the coarse ore bed. Uniform distribution of air and the presence of plenty of air in conjunction with utilization of the high temperatures developed by the suspension roasting operation effects rapid oxidation of the finer particles of the coarse ore and greatly aids in partial desulfurization and conversion to brittle condition of the coarser particles of the coarse ore as the latter is moved outwardly over the hearth 52 toward the burner periphery. In the specific example under discussion in which the diameter of the combustion chamber is around 16 feet, the pitch of the plows 80 and the rate of rotation of rabble arms 70 and 71 may be adjusted so as to move the coarse particles over the hearth in about two hours. An 8 to 12% sulfur dioxide gas may be produced and withdrawn through outlet 125.

Although it is preferred to conduct the suspension roasting phase of the process in the manner described in connection with the burner of Fig. 1, this part of the process may be carried out in other ways. For example, in the burner of Fig. 4, the fines are roasted in a co-current roasting operation.

The fines are fed from hoppers 132 into the upper end of a combustion chamber through nozzles 130 which may be upwardly inclined at an angle of about 25° to the horizontal. Dispersion of fines in the roasting chamber is not dependent upon any particular degree of inclination of the nozzles 130 which may be horizontally disposed if desired. However, to secure best dispersion of the fines in the combustion chamber and most satisfactory roasting, it is not desired to feed the ore into the roasting chamber in such a way that the initial travel of the fines will be downward. The fines are charged into the combustion chamber by air introduced into the injectors through jets 136. Air pressure in jets 136 should be preferably such as to cause a considerable portion of the fines particles to travel approximately three-quarters of the way across the combustion chamber. Although desirable to cause substantial portions of the fines to move a relatively large distance horizontally across the combustion chamber, the injectors should be so operated that fines from one injector do not strike the opposite wall of the combustion chamber. When proceeding as indicated, there is formed within the combustion chamber approximately at or slightly below the level of the inlet ends of nozzles 130 a relatively evenly distributed dispersion of sulfide fines, and as the number of fines particles striking the hot walls in the upper end of the combustion zone is negligible, troublesome scar formation on the walls of the roasting chamber is avoided.

Owing to the relatively extensive horizontal travel of the fines particles in the upper end of the combustion chamber following injection, the particles become rapidly preheated to such an extent that about the time the particles begin to descend through the combustion chamber the ignition temperature is reached and ore particles ignite. In the upper end of the combustion chamber, the feebly combined atom of sulfur distills off and is oxidized to sulfur dioxide. The suspended particles drop, at a rate about or approaching that induced by gravity, and as the fines particles fall through the combustion chamber roasting proceeds rapidly. The amount of air introduced into combustion chamber 142 through the hollow shaft, rabble arms and the air distributing arms is only about that needed to supply oxygen enough to oxidize the sulfur and iron of the finer particles of coarse ore and partial roasting of the coarser particles of coarse ore on hearth 149. The amount of air needed to supply oxygen enough to support oxidation of the fines roasted in suspension is introduced through the ports 143 and may be preheated if desired. The amount of air thus fed into the top of the combustion chamber may be regulated by valve 147 in inlet pipe 146, and passes downwardly through the combustion chamber co-current with the fines. The hearth treatment of the coarse ore is carried out as previously described. The gaseous products of combustion formed are withdrawn through pipe 150 opening into the combustion chamber at a point a short distance above the hearth.

Although the modifications of the process of the invention have been described in connection with roasting of smalls containing about 80% coarse ore and about 20% fines, it will be understood the ratio of coarse to fines may vary considerably according to the nature of the sulfide ore roasted and particular operating conditions encountered. In general, the invention may be utilized to advantage for roasting a body of smalls containing an appreciable quantity of fines. Since run-of-pile of smalls may contain around 20 to 50% by weight of fines it will be seen the process of the invention is especially adapted to handle ores of this type in such a way that grinding costs are materially reduced. It will be understood, however, the quantities of coarse ore and fines need not be obtained by screening a given body of smalls, but may be obtained from different sources if desired.

In all of the modifications of the process, it will be understood that in the time interval during which a given quantity of fines is being run through the burner and roasted in suspension to produce sulfur dioxide gas and iron oxide cinder, in the same time interval a given quantity of coarse ore is introduced into the combustion chamber and passed over the hearth. Depending upon operating conditions such as the nature of the coarse ore, and the rate of rotation of arms 70 and 71 the coarse ore finer particles passing for example 10 mesh are substantially completely desulfurized during movement over the hearth and are discharged from the process by way of screen 55 and chamber 57, while those particles of the coarse ore not passing say ten mesh are incompletely desulfurized, crushed to suspension roasting fineness and recycled by way of drying hearth 17. When roasting an ore containing a relatively large portion of coarse ore, to avoid accumulation of too thick a bed of material on the combustion chamber hearth, it may be necessary to rotate arms 70 and 71 at such a rate that some of the coarser material passing say a ten mesh screen would be incompletely desulfurized. In this situation, it will be understood the mesh of screen 55 may be increased as necessary to separate out all incompletely desulfurized material and recycle the same, after crushing, as fines through the process. It is to be noted the particular mesh of screen 55 is not fixed, but is variable depending upon operating conditions. It will be appreciated the process of the invention is sufficiently flexible to permit change in control conditions sufficient to handle smalls containing widely varying proportions of fines and coarse ore. In my co-pending application Serial No. 55,808, filed December 23, 1935, I have described a process adapted to substantially completely roast metal sulfide smalls containing a relatively large portion of fines.

The invention presents substantial advantages from an economic viewpoint. For example, when working with pyrites smalls passing a half inch screen as mentioned, it would ordinarily be necessary to roast this type of ore in a multi-hearth burner or go to the expense of grinding the raw ore to a sufficient degree of fineness to permit roasting by suspension methods. In accordance with the present invention, an ore of this kind may be roasted in a way that such portion of the coarse ore which may be incompletely desulfurized while passing through the bed roasting operation on the combustion chamber hearth is converted to such a brittle condition that crushing may be easily and inexpensively effected. If it is not desired to grind and complete roasting of the coarse ore in a suspension roasting operation, such coarse ore after conversion to a frangible condition may be further roasted in a bed roasting operation. The frangible condition of the coarse ore rendered bed roasting thereof much more efficient than in the case of coarse ore which has not been so treated. It will thus be seen roasting of smalls of the kind referred to may be carried out much more efficiently than could be accomplished in a multi-hearth roaster.

In the present specification and claims, the expression bed or hearth roasting is used to designate that type of roasting in which (as distinguished from suspension roasting) the ore particles constitute a more or less continuous body but not necessarily in the form of a relatively thin layer on a horizontal hearth.

I claim:

1. The method of roasting coarse metal sulfide ore and metal sulfide fines which comprises introducing the fines into a combustion zone so as to form in the combustion zone a suspension of the fines in oxidizing gas, substantially completely roasting the fines while in suspension in the oxidizing gas thereby producing sulfur dioxide gas and creating high temperatures, forming a bed of the coarse ore, at least partially roasting the coarse ore under influence of the high temperatures developed by the suspension roasting of the fines to produce sulfur dioxide, and recovering sulfur dioxide.

2. The method for roasting coarse metal sulfide ore and metal sulfide fines which comprises introducing the fines into a combustion zone so as to form in the combustion zone a suspension of the fines in oxidizing gas, roasting the fines in suspension in oxidizing gas while passing the fines downwardly through the combustion zone thereby substantially completely roasting the fines while in suspension and producing sulfur dioxide and creating high temperatures, introducing the coarse ore into the bottom of the combustion zone, forming in the bottom of the combustion zone a bed of the coarse ore, at least partially roasting the coarse ore in the combustion zone, under direct influence of the high temperatures developed by the suspension roasting of the fines and while moving the coarse ore slowly through the combustion zone, to produce sulfur dioxide and cinder, withdrawing sulfur dioxide from the combustion zone, and discharging cinder from the bottom of the combustion zone.

3. The method for roasting metal sulfide smalls containing coarse sulfide ore and sulfide fines which comprises separating the coarse ore and the fines, separately introducing the coarse ore and the fines into a combustion zone, introducing the fines into the combustion zone so as to form in the combustion zone a suspension of the fines in oxidizing gas, substantially completely roasting the fines while in suspension in the oxidizing gas thereby producing sulfur dioxide gas and metal oxide cinder and creating high temperatures, forming in the combustion zone a bed of the coarse ore, at least partially roasting the coarse ore in the combustion zone, under direct influence of the high temperatures developed by the suspension roasting of the fines and in the absence of heat other than that developed by roasting of the fines and by such roasting of the coarse ore, to produce sulfur dioxide gas and cinder, and withdrawing sulfur dioxide gas from the combustion zone.

4. The method for roasting coarse metal sulfide ore which comprises introducing the coarse ore into a combustion zone containing oxygen and heated to temperatures not less than about 1300° F., whereby the ore is suddenly subjected to the high temperatures of the combustion zone, sulfur dioxide produced, and the ore is at least partially roasted and the cinder residue converted to a relatively porous frangible condition, recovering sulfur dioxide, discharging cinder from the combustion zone, separating substantially undesulfurized particles from the cinder, converting the particles to fines and roasting such fines in suspension in an oxidizing gas, and recovering sulfur dioxide so produced.

5. The method for roasting coarse metal sulfide ore which comprises introducing the coarse ore into a combustion zone containing oxygen and heated to temperatures not less than about 1300° F., whereby the ore is suddenly subjected to the high temperatures of the combustion zone, sulfur dioxide produced, and the ore is at least partially roasted and the cinder residue converted to a relatively porous frangible condition, maintaining such temperatures in the combustion zone by roasting sulfide fines in suspension, recovering sulfur dioxide, discharging cinder from the combustion zone, separating substantially undesulfurized particles from the cinder, converting the particles to fines, returning the fines to the combustion zone and roasting such fines in suspension, and recovering sulfur dioxide so produced.

6. The method of roasting coarse metal sulfide ore and metal sulfide fines which comprises introducing the fines into a combustion zone, forming in the combustion zone a suspension of the fines in oxidizing gas, roasting the fines while in suspension in the oxidizing gas thereby producing sulfur dioxide gas and creating high temperatures, forming a bed of the coarse ore, at least partially roasting the coarse ore under influence of the high temperatures developed by the suspension roasting of the fines to produce sulfur dioxide and cinder, discharging cinder from the combustion zone, separating susbtantially undesulfurized particles from the cinder, returning the particles to the combustion zone to substantially complete roasting thereof, and recovering sulfur dioxide from the combustion zone.

7. The method for roasting metal sulfide smalls containing coarse sulfide ore and sulfide fines which comprises separating the coarse ore and the fines, introducing the fines into a combustion zone at a point near the bottom thereof and so as to form in the combustion zone a suspension of fines in oxidizing gas, roasting the fines in suspension in the oxidizing gas while causing the fines to pass upwardly and then downwardly through the combustion zone thereby substantially completely roasting the fines while in suspension and producing sulfur dioxide gas and metal oxide cinder and creating high temperatures, introducing the coarse ore into the combustion zone, forming in the bottom of the combustion zone a bed of the coarse ore, at least partially roasting the coarse ore in the said combustion zone, under direct influence of high temperatures developed by the suspension roasting of the fines, to produce sulfur dioxide gas and cinder, withdrawing sulfur dioxide gas from the top of the combustion zone and discharging cinder from the bottom thereof.

8. The method for roasting metal sulfide smalls containing coarse sulfide ore and sulfide fines which comprises separating the coarse ore and the fines, introducing the fines into a combustion zone at a point near the bottom thereof, roasting the fines in suspension in oxidizing gas while causing the fines to pass upwardly and then downwardly through the combustion zone thereby producing sulfur dioxide gas and metal oxide cinder and creating high temperatures, introducing the coarse ore into the combustion zone, forming in the bottom of the combustion zone a bed of the coarse ore, at least partially roasting the coarse ore in the said combustion zone, under direct influence of high temperatures developed by the suspension roasting of the fines, to produce sulfur dioxide gas and cinder, discharging cinder from the bottom of the combustion zone, separating substantially undesulfurized particles from the cinder, crushing the particles to form fines, introducing such fines into the combustion zone along with the first-mentioned fines to roast such fines, and withdrawing sulfur dioxide from the top of the combustion zone.

9. The method for roasting metal sulfide smalls containing coarse ore and sulfide fines which comprises separating the coarse ore and the fines, introducing the fines into a combustion zone so as to form in the combustion zone a suspension of fines in oxidizing gas, roasting the fines in suspension while passing the fines through the combustion zone co-current with a stream of oxidizing gas thereby substantially completely roasting the fines while in suspension and producing sulfur dioxide gas and cinder and creating high temperatures, forming in the combustion zone a bed of the coarse ore, at least partially roasting the coarse ore in the said combustion zone, under direct influence of high temperatures developed by the suspension roasting of the fines, to produce sulfur dioxide gas and cinder, and withdrawing sulfur dioxide gas from the combustion zone.

10. The method of roasting metal sulfide smalls containing coarse sulfide ore and sulfide fines which comprises separating the coarse ore and the fines, introducing the fines into the periphery of a combustion zone at a point near the bottom thereof, introducing into the bottom of the combustion zone substantially all of the oxidizing gas needed in the entire roasting operation, roasting the fines in suspension in oxidizing gas while causing the fines to pass upwardly and then downwardly through the combustion zone thereby producing sulfur dioxide gas and metal oxide cinder and creating high temperatures, introducing the coarse ore into substantially the center of the bottom of the combustion zone and forming in the bottom of the combustion zone a bed of the coarse ore, at least partially roasting the coarse ore in the said combustion zone, under direct influence of high temperatures developed by the suspension roasting of the fines and while slowly working the coarse ore particles outwardly toward the periphery of the combustion zone, to produce sulfur dioxide gas and cinder, discharging cinder from the lower periphery of the combustion zone, separating substantially undesulfurized particles from the cinder, crushing the particles to form fines, introducing such fines into the combustion zone along with the first-mentioned fines to roast such fines, and withdrawing sulfur dioxide from the top of the combustion zone.

11. Apparatus for roasting metal sulfide smalls comprising a shell forming a combustion chamber and having a substantially flat top, means for feeding smalls onto said top, means for passing said smalls over said top toward the periphery thereof, means adjacent said periphery for separating coarse ore and fines, means for feeding the fines into the combustion chamber in a direction having an initial horizontal component and for forming a gaseous dispersion of the fines in the top of the combustion chamber, means including a collector in the lower part of the combustion chamber adapted to feed coarse ore onto about the middle of the bottom of the combustion chamber and for forming a bed of coarse ore in the bottom of the combustion chamber, means for feeding coarse ore to the collector, means for supplying to the combustion chamber oxidizing gas in quantity sufficient to support suspension roasting of the fines and bed roasting of the coarse ore, means for slowly working coarse ore particles outwardly toward the periphery of the combustion chamber, means for discharging cinder from the combustion chamber, and means for withdrawing sulfur dioxide gas therefrom.

12. Apparatus for roasting metal sulfide smalls comprising a shell forming a combustion chamber and having a substantially flat top, means for feeding smalls onto said top, means for passing said smalls over said top toward the periphery thereof, means adjacent said periphery for separating coarse ore and fines, means for feeding the fines into the combustion chamber in a direction having an initial upward and horizontal component, means including a collector in the lower part of the combustion chamber adapted to feed coarse ore onto about the middle of the bottom of the combustion chamber and for forming a bed of coarse ore in the bottom of the combustion chamber, means for feeding coarse ore to the collector, means for supplying to the combustion chamber oxidizing gas in quantity sufficient to support suspension roasting of the fines and bed roasting of the coarse ore, means for slowly working coarse ore particles outwardly toward the periphery of the combustion chamber, means for discharging cinder from the combustion chamber, means for converting at least a portion of the cinder to fines, means for returning such fines to said fines feeding means, and means for withdrawing sulfur dioxide gas therefrom.

13. The method for roasting coarse metal sulfide ore which comprises introducing the coarse ore into a combustion zone containing oxygen and heated to temperatures not less than about 1300° F. whereby the ore is suddenly subjected to the high temperatures of the combustion zone, sulfur dioxide produced, and the ore is at least partially roasted and undesulfurized cinder residue converted to a relatively porous, frangible and readily grindable condition, recovering sulfur dioxide, grinding said cinder residue with the aid of grinding media to thus reduce the cinder residue particles to fines, introducing said resulting fines into a combustion zone heated to temperatures in excess of the ignition point of the fines, forming in said zone a suspension of said fines in oxidizing gas, substantially completely roasting said fines while in suspension in the oxidizing gas, and recovering sulfur dioxide so produced.

EDWIN J. MULLEN.